United States Patent Office 3,783,006
Patented Jan. 1, 1974

3,783,006
COATED CONTAINER AND METHOD OF COATING
Ernest A. Hahn, Plainfield, Ill., Rowland S. Hartzell, Gibsonia, Pa., and Gene Gerek, Oswego, Ill., assignors to PPG Industries, Inc., Pittsburgh, Pa.
No Drawing. Continuation-in-part of abandoned application Ser. No. 18,333, Mar. 10, 1970. This application Dec. 29, 1971, Ser. No. 213,834
Int. Cl. B44d 1/50, 1/36
U.S. Cl. 117—93.31       18 Claims

ABSTRACT OF THE DISCLOSURE

Metal containers for food and beverages have their interior surfaces coated with a composition comprising an acrylic syrup comprising one or more thermoplastic acrylic polymers and one or more acrylic monomers wherein the composition is cured by ionizing irradiation or actinic light. The coatings have a unique combination of properties including excellent taste properties and superior adhesion to the metal container.

CROSS REFERENCE TO RELATED APPLICATIONS

This application is a continuation-in-part of application Ser. No. 18,333, filed Mar. 10, 1970, now abandoned.

This invention relates to containers suitable for packing food and beverages having an interior liner which is extremely adherent to the container.

Metal containers for food and beverages, such as beer and soft drinks, are usually made from aluminum, tinplate, or tin-free steel. Because such food and beverages exert corrosive action upon the metal, a sanitary liner is ordinarily applied to the internal surface of the container in order to protect the container and to prevent contamination of the beverage during storage. The materials that can be used for the liner are limited, since the liner must not introduce any undesirable or toxic materials to the package product, and should not affect its taste. Taste is especially troublesome with beverages because very small taste differences are easily noticed in such products.

Because the interior coatings for containers of this type must have a number of properties which are difficult to obtain in combination, there is a continuous search for coatings which would satisfy these requirements.

To qualify as a coating for the interior of a food or beverage container, the cured coating must:

(1) Not contribute or absorb any taste when in contact with beer, wine, soda and similar beverages for extended periods.
(2) The lining must be flexible enough to withstand severe external impacts during handling without cracking. This is quite important since the container may be dropped during use.
(3) The lining should have good adhesion and the adhesion must be retained during handling and use.
(4) Both relatively thick coatings and relatively thin coatings of the lining material must retain the above properties. In commercial use, relatively thin coatings are applied (ranging as low as about 0.1 mil), but for some applications relatively thick coatings up to about 5 mils or more may be used. Adequate flexibility and impact resistance of such coatings is difficult to achieve.
(5) It is desirable that the coating composition not contain any solvent or other non-reactive volatile component.

It has now been discovered that certain coating compositions when cured in situ on the interior of the container in the manner described herein meet all of the above described properties and provide highly desirable linings for the food and beverage containers described above. These coating compositions comprise an acrylic syrup comprising one or more thermoplastic acrylic polymers and one or more acrylic monomers which are cured by ionizing irradiation or actinic light.

It is noted that the interior of the container also includes can ends, as well as scratched cans which must have a repair coating. By "scratched cans" we mean can interiors or can ends already containing a coating but wherein through processing steps or for some other reason, portions of the coating have been scratched off or removed. It is then necessary to repair the uncoated portion of the metal. The coating composition of this invention may be used as the repair coat.

The acrylic syrups used as the interior linings are 100 percent solids so as to require no solvents. These syrups are polymerizable solutions of acrylic polymers in acrylic and methacrylic monomers. The acrylic syrups are prepared by dissolving 100 percent solids grade of acrylic resins in the acrylic monomers.

The acrylic polymer portion of the acrylic syrup comprises one or more thermoplastic acrylic polymers having a number average molecular weight below about 750,000 and a glass transition temperature of from $-30°$ C. to $80°$ C. The glass transition temperature range is quite important as a glass transition temperature of greater than about $80°$ C. will produce coatings which are brittle, not sufficiently flexible, and the coating will have poor adhesion to the container. If the glass transition temperature of the polymer is lower than about $-30°$ C., the coating will be too soft to produce a uniform coating.

Typical of the soluble thermoplastic acrylic polymers having the properties defined above are made from alkyl methacrylates and acrylates such as isopropyl methacrylate, butyl methacrylate, cyclopentyl methacrylate, hexyl methacrylate, cyclohexyl methacrylate, 2-ethylhexyl methacrylate, octyl methacrylate, 2,2,4-trimethylhexyl methacrylate, decyl methacrylate, isodecyl methacrylate, dodecyl methacrylate, tetradecyl methacrylate, octadecyl methacrylate, isopropyl acrylate, butyl acrylate, octyl acrylate, cyclopentyl acrylate, hexyl acrylate, decyl acrylate, lauryl acrylate, and tetradecyl acrylate and mixtures, which of course give interpolymers of two or more.

The polymers may have number average molecular weights up to about 750,000 but the preferred acrylic polymers have number average molecular weights of from 5,000 to 100,000.

The acrylic monomer portion of the acrylic syrup comprises one or more acrylic monomers having the formula:

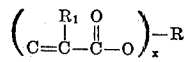

wherein R is selected from the group consisting of H, alkyl, aryl, cycloalkyl, substituted alkyl, substituted aryl and substituted cycloalkyl, and

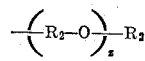

where $R_2$ is an alkylene radical and z is a whole number from 2 to 25 and

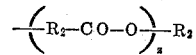

wherein $R_2$ and z are as described above, and $R_1$ is selected from the group consisting of H and $CH_3$, and x is a number having a value of 1 to 4.

The alkyl groups may be methyl, ethyl, propyl, isopropyl, butyl, hexyl, octadecyl, and the like. It is preferred that the alkyl group contains from 1 to 10 carbon atoms. Any aryl group may be used such as benzyl, phenyl, and the like. Preferably, however, the aryl group contains from 6 to 18 carbon atoms. Cycloalkyl groups which R may represent are cyclohexyl, cyclopentyl, cyclooctyl, and the like. The preferred cycloalkyl group contains up to about 8 carbon atoms. The alkyl, aryl and cycloalkyl groups may be substituted with halogens, hydroxyl groups, and the like.

$R_2$ may be any alkylene radical such as ethylene, propylene, isobutylene, etc., but it is preferred that $R_2$ contain from about 2 to about 8 carbon atoms.

While $R_1$ may be either H or $CH_3$, at least 20 percent by weight of the monomer must be the acrylate wherein $R_1$ is H. Where a repair coat is desired for a can lining or can end, it is preferable to include at least a portion of the monomer wherein $R_1$ is $CH_3$.

Typical of the acrylic monomers which may be employed are methyl acrylate, isopropyl acrylate, cyclopentyl acrylate, 2-ethylhexyl acrylate, decyl acrylate, decyl thioacrylate, dodecyl acrylate, octadecyl acrylate, acrylic acid, methacrylic acid, crotonic acid, hydroxy ethyl acrylate, hydroxy butyl acrylate, diacrylates such as ethylene glycol diacrylate, triethylene glycol diacrylate, polypropylene glycol diacrylate, butylene gycol diacrylate, 1,4-butane diol diacrylate, triacrylates, such as ethylene glycol triacrylate, trimethylol propane triacrylate, and the like, and tetraacrylates such as pentaerythritol tetraacrylate, polypropylene glycol trimethylol propane tetraacrylate, polypropylene glycol ether or pentaerythritol, and the like. The preferred acrylic monomers are lower alkyl acrylates.

The acrylic syrup should comprise from about 5 percent to about 60 percent by weight of the acrylic polymers. This is important for ease of application. The viscosity of the syrup increases as the molecular weight of the polymer and the proportion of polymer increases. It is preferred to use higher levels of lower molecular weight polymers and lower levels of higher molecular weight polymers to achieve proper application viscosity. Hence, at about the 5 percent level of polymer, the number average molecular weight of the polymer may be as high as 750,000 or more, while at a level of about 60 percent by weight of the acrylic polymers, it is preferred that the molecular weight of the polymer be 5,000 or lower. In this method, it is preferred to use a syrup comprising 20 percent polymers and 80 percent monomers wherein the polymers have a number average molecular weight of 60,000.

The acrylic syrups may optionally contain minor amounts of materials such as waxes such as paraffin wax, and the like, to inhibit the monomer loss prior to the coating and curing steps. If a wax is to be used, it is preferred to use about 0.15 to about 1.5 percent by weight of the monomer components.

The coating material may also contain other materials such as dyes, slip agents, inert pigments, tints, and the like.

The metal sheet or coil which is used to form the container or can end may be coated with the coating material or with a conventional base coat and top coated with the coating material of this invention using any conventional method of application such as roll coating, spraying, curtain coating, and the like. Unlike the bulk of the coatings now being used in the container industry, the coating of this invention requires only one coat and there is no necessity for using a primer. Since the coating is 100 percent solids, it is preferred to apply the coating with a direct roll coater whereby an appropriately thin and uniform coating may be obtained.

The film thickness of the coating may be varied over a wide range but it is preferable to use a thickness of from about 3 to about 7 milligrams per square inch.

The containers to which the above composition is applied are usually made of a metal such as aluminum although tin-plate (cold rolled steel to which a thin layer of tin has been applied) and tin-free steel can also be employed, as can other materials, which need not always be metal. The containers can be of various sizes and shapes.

It is noted that the coatings can also be utilized as an exterior coating for the containers and, as such, it may be desired to coat both sides of the metal prior to forming the container body.

The coating material must be cured by subjecting it to ionizing irradiation or to actinic light.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, van de Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This enregy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the Arco type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The compositions described herein will polymerize acceptably using any total dosage between about 0.2 megarad and about 100 megarads. A "rad" is defined as that amount of radiation required to supply 100 ergs per gram of material being treated, and a "megarad" is $10^6$ rads. The total dosage is the total amount of irradiation received by the coating compositions. It has been found that the coatings will cure to form an excellent liner for food and beverage containers at a total dosage of less than 2 megarads. Preferable total dosage is about 5 or 6 megarads.

The compositions herein will also cure by exposure to actinic light. The compositions are charged with photo initiators and exposed to ultra-violet light. Generally, it is preferred to use lamps which will emit UV light of wavelengths about 250 n$\mu$ and longer. The time required for curing of these materials by ultra-violet light is about equivalent to the time required for the ionizing irradiation cure.

If both the interior and exterior of the formed container are to be coated with the coating of this invention and the container metal is radiation permeable such as aluminum, the interior and exterior coatings can be cured in one pass under the electron source.

The following examples set forth specific embodiments of the instant invention, however, the invention is not to be construed as being limited to these embodiments for there are, of course, numerous possible variations and modifications. All parts and percentages in the examples as well as throughout the specification are by weight unless otherwise indicated.

Example 1

A vessel was charged with 36 grams of a copolymer of 55 percent ethyl acrylate and 45 percent methyl methacrylate (Acryloid B-82) having a glass transition temperature of 20° C., 20 grams of ethyl acrylate, 50 grams of butyl acrylate, 7.8 grams of acrylic acid, 1.2 grams of benzidene yellow tint, and 1.0 gram of spermaceti (wax). The 100 percent solids composition was mixed thoroughly and coated by a roll coater to a tin-free steel coil which was then subjected to electron beam impingement. The total dose received by the coating was 5 megarads and the coating weight of the cured coating was 4 milligrams per square inch. The coated coil was then formed into 10 beer containers 5 inches high, 2.5 inches in diameters with a gross capacity of 0.1 gallon.

The above containers were tested for their suitability for packaging foods and beverages as described below. These tests included the following:

Four cans were filled with beer and sealed. The beer was then flash pasteurized by heating at 190° F. for ½ minute. After the containers had cooled, three cans were stored for periods of one, two, and three months, respectively, and the remaining can was emptied and tested for blush resistance, adhesion and fabrication properties.

The blush resistance was determined by observing the container for absorption of water as exhibited by a whitening of the coating. In this case, the coating exhibited no whitening and passed the blush resistance test.

Adhesion to the container was tested by marking an X on the coating (cross-hatching) and covering with a pressure-sensitive adhesive tape and removing the tape quickly. Any loss of adhesion is evidenced by removal of some of the coating on areas contiguous to the X marking. No loss of adhesion was noted by the above coating.

The ability to withstand fabrication processes was tested by the "double seam" test. The can was opened along the can end and the end was removed. The can was then double seamed and refilled with beer and pasteurized at 190° F. for ½ minute. The can was opened again and observed for coating removal on the fabricated edge. There was no coating failure with the can of this example.

The cans which were pasteurized and left to stand for 1 month and 2 months were opened and the beer was subjected to a taste test. Both cans passed the taste test with no observable taste difference in the beverage stored in the cans.

The beer in the can which was pasteurized and left to stand for 3 months was taste tested and passed easily. The beer from the can was then further tested for the presence of iron from the container wall. This is a test to determine the resistance of the coating to the migration of iron in the container through the coating to the beer. An acceptable level is 0.35 part per million of iron in the beer or less. The beer tested from this can showed only 0.1 part per million of iron.

Four more cans were filled with beer and pasteurized by heating at 150° F. for 90 minutes. The same tests were prepared on these cans and the same results as those above were obtained.

Another can was formed and tested by the "hot fill test" by filling it with hot tomato soup and closing the can while hot and storing for 6 months. After this time, the can was examined for staining and the can was found to be stain free. The can was then given the adhesion and double seam tests and passed both.

Another can was given a food processing test. The can was filled with spam and the spam was cooked in the can at 250° F. for 90 minutes and closed. After the can had cooled, the can was opened and the coating was tested for stains resulting from the high temperature and hot grease. The coating was also tested for possible softening. The coating in this can showed no stains and did not soften.

Sheets of the coated tin-plate were then subjected to the block test. The dried coated sheets were stacked one upon the other and subjected to a 35 pounds per square inch gauge pressure and kept at 100° F. for 18 hours. After this time, the sheets were still free of one another. Thus the coated sheets did not hot-meld under these circumstances.

All of the above tests were then prepared on a series of cans prepared by coating aluminum sheets in the same manner with the same coating and subsequently forming cans. The aluminum cans passed the same tests as those listed above.

Thus, it is seen that containers formed by the process of this invention pass all taste tests, adhesion tests, and other tests required by the container industry.

Example 2

Example 1 is repeated except the Acryloid B-82 polymer is replaced with a 60 percent butyl acrylate-40 percent methyl methacrylate copolymer. Similar results are obtained.

Example 3

Example 1 is repeated except the coating was prepared by mixing 36 grams of Acryloid B-82, 123.2 grams of ethyl acrylate, 30.6 grams of butyl acrylate, 4.0 grams of acrylic acid, 20 grams of trimethylolpropane triacrylate, 2.4 grams of benzidene yellow tint and 1.6 grams of spermaceti (wax). The results are similar to those obtained in Example 1.

Example 4

Example 1 was repeated except the coating was prepared by mixing 38.4 grams of Acryloid B-82, 17.2 grams of ethyl acrylate, 103.2 grams of butyl acrylate, 17.2 grams of glycidyl acrylate, 11.7 grams of acrylic acid, 11.2 grams of hydroxy ethyl acrylate, and 1.6 grams of spermaceti (wax). The results are similar to those obtained in Example 1.

Example 5

A vessel was charged with 15 parts by weight of a copolymer comprising 19.5% butyl methacrylate, 18% methyl methacrylate, 20% ethyl hexyl acrylate, 30% styrene, 25% methacrylic acid, and 10% hydroxy ethyl acrylate, said polymer having a number average molecular weight of approximately 400,000 and 50 parts by weight of butyl acrylate, 10 parts by weight of hydroxy ethyl acrylate, 10 parts by weight of acrylic acid, and 5 parts by weight of ethyl acetate. The composition was mixed thoroughly and drawn down on a tin-free steel coil and subjected to electron beam impingement in a nitrogen gas atmosphere for a total dosage of 9 megarads. The resulting coated foil was cured and capable of being used as the interior of a container.

According to the provisions of the patent statutes, there are described above the invention and what are now considered to be its best embodiments. However, within the scope of the appended claims, it is to be understood that the invention can be practiced otherwise than as specifically described.

We claim:

1. A food and beverage container having its internal surface coated with a cured coating composition comprising an acrylic syrup comprising one or more thermoplastic acrylic polymers having a number average molecular weight below about 750,000 and a glass transition temperature having a range of $-30°$ C. to about $80°$ C. and one or more acrylic monomers having the following formula:

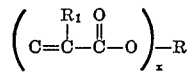

wherein R is selected from the group consisting of H, alkyl, aryl, cycloalkyl, substituted alkyl, substituted aryl and substituted cycloalkyl, and

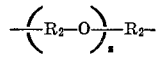

wherein $R_2$ is an alkylene radical and $z$ is a whole number from 2 to 25 and

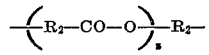

wherein $R_2$ and $z$ are as above described, and $R_1$ is selected from the group consisting of H and $CH_3$ and $x$ is a number having a value of 1 to 4, said composition having been cured by ionizing irradiation.

2. The container of claim 1 wherein the coating composition comprises from about 5 to about 60 percent by weight of acrylic polymers.

3. The container of claim 1 wherein at least one acrylic monomer is a lower alkyl acrylate.

4. The container of claim 1 wherein at least 20 percent by weight of the monomer component comprises the monomer where $R_1$ is H.

5. The container of claim 1 in which said surface is aluminum.

6. The container of claim 1 in which said surface is steel.

7. The container of claim 1 in which said cured layer has an average thickness of from 4 milligrams per square inch to 6 milligrams per square inch.

8. The container of claim 1 wherein the composition is cured by actinic light.

9. The container of claim 1 wherein the acrylic polymer has a number average molecular weight below about 250,000.

10. The method of coating the interior of a food and beverage container comprising applying to the interior of said container a coating composition comprising an acrylic syrup comprising one or more thermoplastic acrylic polymers having a number average molecular weight below about 750,000 and a glass transition temperature between about $-30°$ C. and $80°$ C. and one or more acrylic monomers having the following formula:

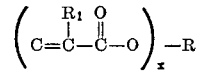

wherein R is selected from the group consisting of H, alkyl, aryl, cycloalkyl, and substituted alkyl, cycloalkyl and aryl, and

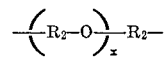

wherein $R_2$ is an alkylene radical and $z$ is a whole number from 2 to 25 and

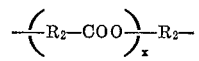

wherein $R_2$ and $z$ are as above described, and $R_1$ is selected from the group consisting of H and $CH_3$, and X is a number having a value of 1 to 4, and subjecting said coating to ionizing irradiation to cure.

11. The method of claim 10 wherein the coating composition comprises from about 5 percent to about 60 percent by weight of acrylic polymers.

12. The method of claim 10 wherein at least 20 percent by weight of the monomer component comprises the monomer where $R_1$ is H.

13. The method of claim 10 wherein the container has an aluminum base.

14. The method of claim 10 wherein the container has a steel base.

15. The method of claim 10 wherein the outside of the container is also coated with the composition and cured by ionizing irradiation.

16. The method of claim 15 wherein the container surface is radiation permeable and both the interior and exterior coatings are cured simultaneously by a single radiation source.

17. The method of claim 10 wherein the coating is subjected to actinic light to cure.

18. The method of claim 10 wherein the acrylic polymer has a number average molecular weight below about 250,000.

References Cited
UNITED STATES PATENTS

| | | | |
|---|---|---|---|
| 3,281,008 | 10/1966 | D'Andrea | 220—63 |
| 3,117,693 | 1/1964 | Vogel | 117—97 X |
| 2,947,716 | 8/1960 | Cornell et al. | 204—159.16 X |
| 2,986,507 | 5/1961 | Steck | 204—159.16 |
| 3,359,129 | 12/1967 | Mao | 117—93.31 |

RALPH HUSACK, Primary Examiner

U.S. Cl. X.R.

117—2 R, 97, 132 C, 161 UC, 161 UZ, DIG. 3: 204—159.16; 220—64

UNITED STATES PATENT OFFICE
CERTIFICATE OF CORRECTION

Patent No. 3,783,006                Dated January 1, 1974

Inventor(s) Ernest A. Hahn, Rowland S. Hartzell and Gene Gerek

It is certified that error appears in the above-identified patent and that said Letters Patent are hereby corrected as shown below:

In column 8, line 15, the formula

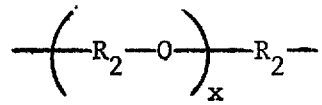

should read

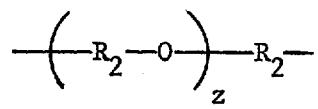

In column 8, line 20, the formula

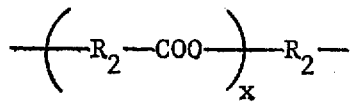

should read

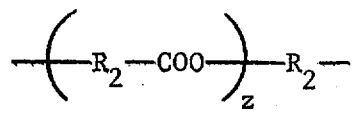

Signed and sealed this 11th day of June 1974.

(SEAL)
Attest:

EDWARD M. FLETCHER, JR.
Attesting Officer

C. MARSHALL DANN
Commissioner of Patents